(12) United States Patent
Hums et al.

(10) Patent No.: US 6,228,801 B1
(45) Date of Patent: May 8, 2001

(54) PROCESS FOR PRODUCING A CATALYST

(75) Inventors: Erich Hums, Hessdorf (DE); Alexander Khinsky, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/217,854

(22) Filed: Dec. 21, 1998

Related U.S. Application Data

(63) Continuation of application No. PCT/DE97/01161, filed on Jun. 9, 1997.

(30) Foreign Application Priority Data

Jun. 21, 1996 (DE) .............................................. 196 24 923

(51) Int. Cl.⁷ .............................. B01J 21/06; B01J 23/30
(52) U.S. Cl. ........................................... 502/350; 502/309
(58) Field of Search .................................... 502/305, 308, 502/309, 350

(56) References Cited

U.S. PATENT DOCUMENTS

| | | | |
|---|---|---|---|
| 3,271,326 | 9/1966 | Forney et al. | |
| 4,002,653 * | 1/1977 | Reuter et al. | 260/369 |
| 4,255,285 * | 3/1981 | Engelbach et al. | 252/443 |
| 4,545,883 * | 10/1985 | Ovshinsky et al. | 204/192 |
| 4,691,071 * | 9/1987 | Bricker | 585/319 |
| 5,045,516 * | 9/1991 | Vogel et al. | 503/309 |
| 5,087,600 * | 2/1992 | Kato et al. | 502/309 |
| 5,204,302 | 4/1993 | Gorynin et al. | |
| 5,225,390 * | 7/1993 | Vogel et al. | 502/309 |
| 5,409,681 * | 4/1995 | Kato et al. | 423/239 |
| 5,668,076 * | 9/1997 | Yamagushi et al. | 502/343 |

FOREIGN PATENT DOCUMENTS

| | | |
|---|---|---|
| 38 13 312 A1 | 11/1989 | (DE) . |
| 39 16 398 A1 | 11/1990 | (DE) . |

* cited by examiner

Primary Examiner—Steven P. Griffin
Assistant Examiner—Christina Ildebrando
(74) Attorney, Agent, or Firm—Herbert L. Lerner; Laurence A. Greenberg; Werner H. Stemer

(57) ABSTRACT

A process for producing a catalyst with a catalytically active composition on a support body by thermal spraying and a catalyst produced thereby. A spraying material including a reactive precursor of at least one component of the catalytically active composition is thermally sprayed onto the support body and the reactive precursor is converted to form the component. A catalyst having a high BET surface area can be produced in this way. At the same time, an inactivation of a thermally sensitive component during the spraying process can be avoided.

13 Claims, 1 Drawing Sheet

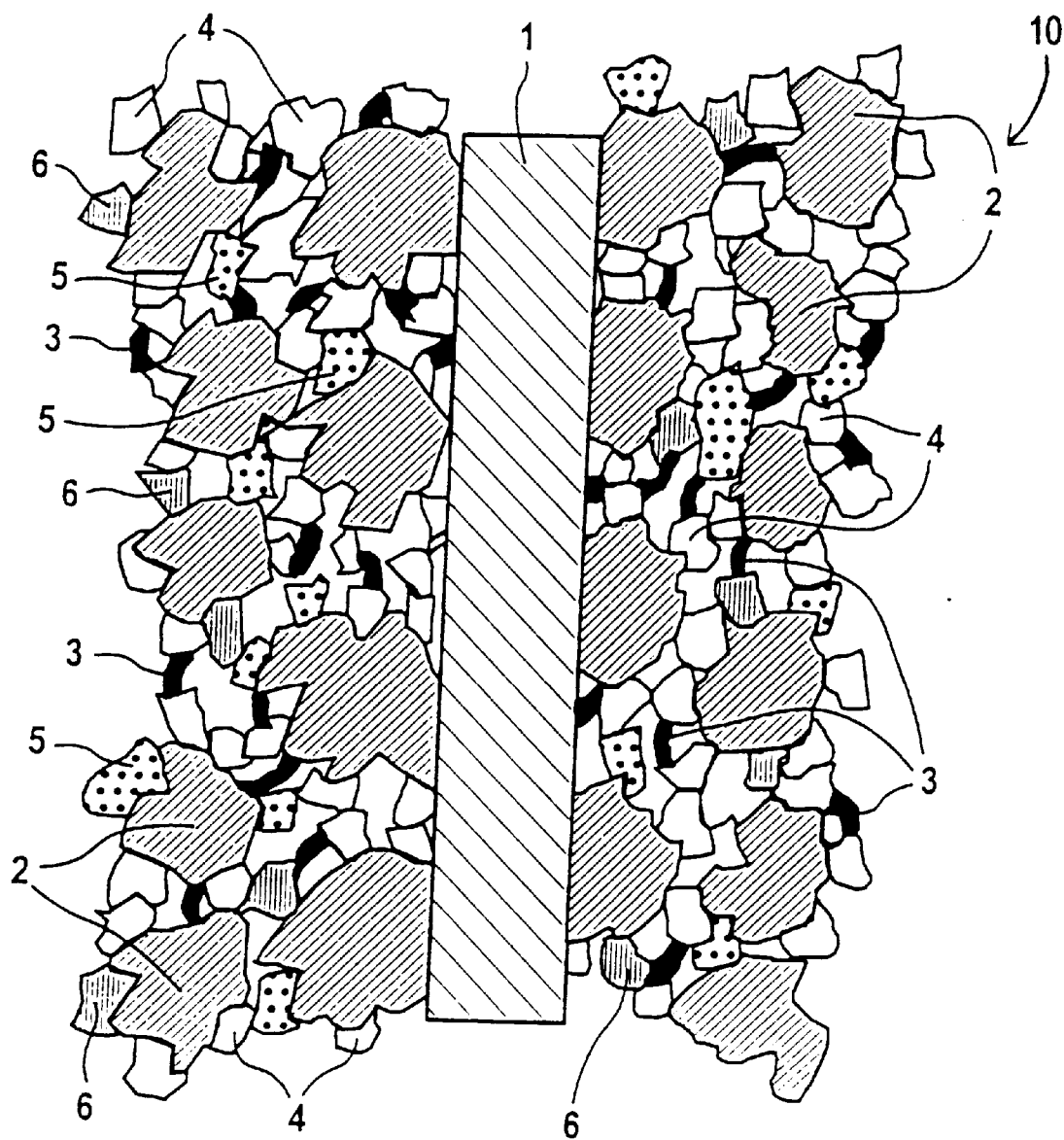

PROCESS FOR PRODUCING A CATALYST

CROSS-REFERENCE TO RELATED APPLICATION

This application is a continuation of copending International Application No. PCT/DE97/01161, filed on Jun. 9, 1997, which designated the United States.

BACKGROUND OF THE INVENTION

FIELD OF THE INVENTION

The invention relates to a process for producing a catalyst with a catalytically active composition on a support body by thermal spraying and a catalyst produced according to that process.

U.S. Pat. No. 3,271,326 discloses an essentially nickel-containing catalyst in which a catalytically active surface is applied by flame spraying. In that case, in a first process step, a steel support structure which had previously been mechanically roughened has aluminum flame sprayed on to it for the purpose of further roughening. Subsequently, in a second process step, the catalytically active components are applied by flame spraying to the support structure which was pretreated in that way. A characteristic of that complicated production process is that the catalytically active components which are sprayed on are heated up to their melting point.

Furthermore, German Published, Non-Prosecuted Patent Application DE 38 13 312 A1 discloses applying a titanium dioxide modified with catalytically active components as additives to a metallic structure by thermal spraying. In that procedure, the catalytic ally active components melt briefly and upon cooling fuse together at contact points. That creates a catalytically active surface held together by adhesion forces.

However, it is known that the catalytic activity of the titanium dioxide is very strongly dependent on the proportion of the titanium dioxide which is present in the anatase modification. The anatase modification of titanium dioxide in that case has the property of being converted irreversibly by high temperatures into the less active rutile modification. Nuclei of titanium oxide in the rutile modification in the crystal microstructure grow further upon heating at the expense of the anatase modification.

On that subject, German Published, Non-Prosecuted Patent Application DE 39 16 398 A1 discloses mixing a very low-melting component into the spraying material containing a thermally sensitive component such as titanium dioxide in the anatase modification. The melting point of the very low-melting component in that case is below an inactivation temperature above which, upon influence by a chemical change, for example, the amount of the thermally sensitive component is irreversibly reduced. During thermal spraying, the spraying material is heated only to the melting point of the very low-melting component, so that inactivation of the thermally sensitive component is avoided. The adhesion of the components of the spraying material to one another occurs due to the very low-melting component flowing around other particles and fusing together during the thermal spraying. That enables a surface having a high catalytic activity to be achieved by thermal spraying, even in the presence of a thermally sensitive component.

However, a very low-melting component flowing around a catalytically active component reduces the specific surface area or BET surface area of the composition being applied. In order to achieve a high catalytic activity, the layer thickness of the catalytically active composition being applied accordingly has to be increased. The longer spraying time resulting therefrom can then easily lead to thermal distortion of the support body or the support structure. The process is therefore only suitable for support structure thicknesses of more than about 3 mm.

SUMMARY OF THE INVENTION

It is accordingly an object of the invention to provide a process for producing a catalyst and a catalyst produced thereby, which overcome the hereinafore-mentioned disadvantages of the heretofore-known processes and products of this general type, in which the catalyst includes a catalytically active composition on a support body, in which the catalyst is produced by thermal spraying without thermally sensitive components becoming inactivated and in which the catalytically active composition has a significantly increased BET surface area as compared with the prior art.

With the foregoing and other objects in view there is provided, in accordance with the invention, a process for producing a catalyst with a catalytically active composition on a support body by thermal spraying, which comprises thermally spraying a spraying material including a titanium hydroxide reactive precursor of at least one component of the catalytically active composition onto the support body, and converting the titanium hydroxide reactive precursor to form the component.

In accordance with another mode of the invention, the thermal spraying step is carried out with a titanium metahydroxide as the titanium hydroxide.

The invention is based on the concept, that is exactly contrary to the opinion of those skilled in the art, of selecting a composition for the spraying material which is not the same as that for the catalytically active composition to be applied to the support body. Rather, for at least one component of the catalytically active composition, a reactive precursor which is selected in the spraying material is converted to form the component. In this way, for example in the case of a thermally sensitive component such as titanium dioxide, the inactivation favored by a temperature rise during the spraying process can be avoided. This is because the component is only produced from the reactive precursor during or after the spraying process and as a result cannot be inactivated by a temperature rise occurring before conversion.

It has been found that a catalytically active composition produced by the process of the invention has a high BET surface area of from 50 to 70 $m^2/g$. According to comprehensive studies, it can be assumed that during the conversion of the reactive precursor linking of chemical compounds occurs which lead to the formation of interconnected microcrystallites. Such an assembly of connected microcrystallites has a high specific surface area. The high BET surface area enables the layer thickness of the catalytically active composition to be considerably reduced as compared with the prior art while maintaining an equally high catalytic activity. As a result of the shorter spraying time associated therewith, a support body having a thickness of less than 100 $\mu$m is suitable for the application of the catalytically active composition without thermal distortion occurring during application. Such a material saving allows the manufacturing costs to be reduced correspondingly. Suitable support bodies are metallic or ceramic bodies of any shape, e.g. in the form of a plate, a band, a rod or a tube. It is also conceivable to use a material other than metal or ceramic for the support body, as long as it cannot be damaged by the elevated temperature during the spraying process.

In accordance with another mode of the invention, the conversion or chemical reaction of the reactive precursor is carried out by thermal activation during spraying. The spraying material in this case is heated during the thermal spraying to above a corresponding activation temperature above which a chemical reaction of the precursor commences.

In accordance with a further mode of the invention, the thermal activation of the reactive precursor can also be carried out after spraying is completed by heat treatment of the catalytically active composition applied or the support body at above the activation temperature. Such a heat treatment can also include a calcination process.

In accordance with an added mode of the invention, a suitable reactive precursor convertible by thermal activation is, in particular, a readily thermally decomposable metal salt or a compound of a metal bearing a hydroxy group (hydroxy compound). A metal salt or an ionic compound of the corresponding metal can be ionized by appropriate heat input into a cation and an anion. Such an ionization takes place, for example, in any candle flame. If the temperature during thermal spraying, which for the purposes of the present invention includes both plasma and flame spraying, is selected so as to be appropriately high, a free metal ion can react with a gas molecule of the surrounding atmosphere and, for example, with oxygen to form a metal oxide as a desired component. For the purposes of the present invention, a hydroxy compound of a metal is a not yet completely dewatered, i.e. still containing OH groups, oxide compound of the metal. Such compounds can be easily converted thermally into the corresponding oxide with elimination, if necessary even multiple elimination, of water. In this way, a hydroxy compound of a metal can be converted into a metal oxide through the use of an appropriately selected temperature during the spraying process.

In accordance with an additional mode of the invention, the metal salt being used is an oxalate, a nitrate or a carbonate. Such a metal salt can be ionized particularly easily, i.e. at a temperature of less than 500° C.

In accordance with yet another mode of the invention, the reactive precursor is an aluminum hydroxide, preferably a gibbsite (monoclinic γ-Al(OH)$_3$) or a boehmite (rhombic crystalline metahydroxide γ-AlO(OH)), or a titanium hydroxide, preferably a titanium metahydroxide TiO(OH)$_2$, also known as metatitanic acid. Both the aluminum hydroxide and the titanium metahydroxide can be easily converted into the corresponding oxide form through the use of relatively high temperatures. The titanium dioxide TiO$_2$ produced by the thermal activation of the titanium metahydroxide TiO(OH)$_2$ is a main constituent of many catalysts. In particular, a catalyst containing titanium dioxide is particularly suitable for removing nitrogen oxides through the use of the known DeNO$_x$ process.

The catalytically active composition applied by thermal spraying has a particularly high BET surface area if the spraying material being used includes a plurality of reactive precursors. For example, titanium metahydroxide TiO(OH)$_2$ can be used as a reactive precursor for the catalytically active component titanium dioxide TiO$_2$, a boehmite and/or a gibbsite can be used for aluminum oxide Al$_2$O$_3$, and an oxalate can be used as respective reactive precursor for further catalytically active components. Appropriate heating of the spraying material during thermal spraying leads to increasing elimination of water from the hydroxy compounds. The elimination of an OH group from metatitanic acid and a proton from aluminum hydroxide can easily result in formation of a ternary oxide or mixed oxide of aluminum and titanium. The other reactive precursors are ionized and, for example, converted into their oxides in an oxygen-containing atmosphere. In this way, a highly catalytically active composition can be produced on a support body by thermal spraying.

As already mentioned, titanium dioxide can exist both in a rutile and in an anatase modification. The anatase modification has a significantly increased catalytic activity as compared with the rutile modification.

In accordance with yet a further mode of the invention, preferential crystallization of the favorable modification occurs when a coprecipitate is mixed into the spraying material. For the purposes of the present invention, coprecipition is a precipitation of a chemical element or a chemical compound in the presence of materials which are soluble. A coprecipitate is accordingly a precipitate of a chemical element or a chemical compound mixed with another material. For example, a titanium dioxide mixed with tungsten can be obtained from a solution containing titanyl sulfate and paratungstate. The tungsten atoms in this case are incorporated into intersitial sites of the titanium dioxide lattice. Drying and calcination of this coprecipitate gives a titanium dioxide crystallized within the anatase modification, with the intercalated tungsten atoms acting as a block for the phase transformation into the rutile modification. A further coprecipitate is, for example, a crystalline mixture of metatitanic acid and tungstic acid (TiO(OH)$_2$/WO(OH)$_2$). Such a coprecipitate can prevent a phase transformation into an unfavorable crystalline modification from occurring at all during conversion of a reactive precursor into a catalytically active component.

In accordance with yet an added mode of the invention, the thermal spraying is carried out in an oxygen-containing atmosphere for the production of a catalyst containing a metal oxide. In this case, a free metal ion (formed by the ionization of a salt) combines with oxygen to give a metal oxide.

In accordance with yet an additional mode of the invention, a metal or a metal alloy is sprayed in parallel with the spraying material, with the metal or the metal alloy and the spraying material being intimately mixed during spraying before they impinge on the support body. In this case, the metal or the metal alloy acts, as described in the introduction in the acknowledgement of the prior art, as a composite material. During the spraying process, the softened metal or the softened metal alloy flows around the other components and contributes to their adhesion to one another and to the support body. Particularly suitable metals or metal alloys are aluminum and aluminum alloys.

In accordance with again another mode of the invention, a spraying material which is particularly readily handleable for thermal spraying is in the form of a powder mixture made from separate powders each having a mean particle size of less than 50 µm, preferably less than 10 µm. The separate powders are intensively mixed prior to the spraying process. The metal or the metal alloy can equally well be sprayed separately. The small particle size that is used enables a good conversion of the reactive precursors and an increase in the BET surface area of the catalytically active composition which is applied to be achieved.

With the objects of the invention in view there is also provided a catalyst, comprising a catalytically active composition produced by thermal spraying of a spraying material onto a support body; the spraying material including a titanium hydroxide reactive precursor of at least one component of the catalytically active composition; and the titanium hydroxide reactive precursor having been converted before or after spraying to form the at least one component.

In accordance with another feature of the invention, the catalytically active composition includes multinary compounds. For the purposes of the present invention, a multinary compound is a complex or mixed compound of a plurality of components of the catalytically active composition. Such a compound contributes substantially to improved adhesion of the individual components to one another. If, for example, a first reactive precursor being used is a vanadium oxalate and a second reactive precursor is a metatitanic acid, then a multinary compound in the form of a mixed metal oxide containing oxygen and both vanadium and titanium can be formed during thermal spraying in an oxygen-containing atmosphere.

In accordance with a further feature of the invention, the catalytically active composition has a BET surface area of from 40 to 100 m$^2$/g, preferably from 50 to 70 m$^2$/g. Such a high BET surface area enables a high catalytic activity of the catalyst to be achieved even with a low layer thickness of the catalytically active composition. Since a reduced layer thickness of the catalytically active composition is linked to a shorter spraying time, a support body having a low thickness can also be used without distortion of the support body occurring during thermal spraying.

In accordance with an added feature of the invention, the support body has a thickness of less than 1 mm, preferably less than 100 $\mu$m.

The support body itself can be formed of a metal or a ceramic. In this case the support body can have any desired structure, e.g. in the form of a plate, a band, a rod or a tube. The support body can also have a honeycomb structure.

In accordance with a concomitant feature of the invention, the material for the support body is a chromium-aluminum steel. Such a support body enables a high operating life of the catalyst to be achieved.

In order to obtain improved adhesion of the catalytically active composition, the support body can be mechanically or chemically roughened prior to application of the catalytically active composition.

Other features which are considered as characteristic for the invention are set forth in the appended claims.

Although the invention is illustrated and described herein as embodied in a process for producing a catalyst and a catalyst produced thereby, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a diagrammatic, cross-sectional view of a support body of a catalyst of the invention and components of a catalytically active composition applied thereto by thermal spraying.

DESCRIPTION OF THE PREFERRED EMBODIMENTS

Table 1 shows possible components of a spraying material for producing a DeNO$_x$ catalyst, with a respective percentage by mass and a respective mean particle size being indicated.

Table 2 shows four alternative compositions of a spraying material for producing a DeNO$_x$ catalyst, with the components shown being taken from Table 1.

In the case of the illustrative embodiments, which concern catalysts having oxidic catalytically active components, the thermal spraying takes place in an oxygen-containing atmosphere. The temperature during the thermal spraying is selected in such a way that the thermal activation of the reactive precursor is complete before it impinges on the support body. As a final step, the composition which is applied is calcined. This achieves complete dewatering and a final oxidic structure of the catalytically active composition. The spraying material that is used is always a powder mixture of separate powders of the respective components. The mean particle sizes of the individual components of the spraying material are shown in Table 1.

TABLE 1

| Component | Percentage by Mass | Mean Particle Size |
| --- | --- | --- |
| Aluminum | 8.0% | <30 $\mu$m |
| Aluminum alloy (AlMg$_3$) | 8.0% | <30 $\mu$m |
| Boehmite | 26.0% | <10 $\mu$m |
| Gibbsite | 16.5% | <10 $\mu$m |
| Vanadium oxalate | 4.0% | <10 $\mu$m |
| Tungsten oxalate | 3.75% | <10 $\mu$m |
| Coprecipitate (TiO$_2$/WO$_3$) | 37.5% | <1 $\mu$m |
| Coprecipitate (TiO(OH)$_2$/H$_2$WO$_4$) | 37.5% | <1 $\mu$m |
| TiO(OH)$_2$ | 33.75% | <10 $\mu$m |

Table 1 shows, for a spraying material in the form of a powder mixture, suitable components for producing a DeNO$_x$ catalyst for the degradation of nitrogen oxides in a waste gas of a combustion plant using a reducing agent such as ammonia.

Table 2 shows the respective percentages by mass (column 2) and the respective mean particle sizes (column 3). Separate parallel spraying of the aluminum or aluminum alloy, in this case including aluminum and manganese, is carried out. Mixing with the other components occurs before they impinge on the support body. The remaining components are mixed to form a spraying material before thermal spraying. It is possible to use either a metatitanic acid or a mixture of tungstic acid with a metatitanic acid in the form of a coprecipitate, as a reactive precursor for the titanium dioxide which is catalytically active in a DeNO$_x$ catalyst. It is also possible to use a dried and calcined joint precipitate of titanium and tungsten from a solution containing titanyl sulfate and paratungstate, as such a coprecipitate. In this coprecipitate, the titanium dioxide is predominantly in the catalytically active anatase modification, with the tungsten being incorporated in interstitial lattice sites. The mixing in or incorporation of tungsten prevents the conversion of titanium dioxide from the anatase modification into the undesired rutile modification.

TABLE 2

| Composition | Example 1 | Example 2 | Example 3 | Example 4 |
| --- | --- | --- | --- | --- |
| Aluminum | X | X | X | |
| Aluminum alloy | | | | X |
| Boehmite | X | X | X | X |
| Gibbsite | X | X | X | X |
| Vanadium oxalate | X | X | X | X |

TABLE 2-continued

| Composition | Example 1 | Example 2 | Example 3 | Example 4 |
|---|---|---|---|---|
| Tungsten oxalate | X | | | |
| Coprecipitate ($TiO_2$/$WO_3$) | | | X | |
| Coprecipitate ($TiO(OH)_2$/$H_2WO_4$) | | X | | X |
| Metatitanic acid ($TiO(OH)_2$) | X | | | |

Table 2 shows four alternative possible compositions of a spraying material for producing a $DeNO_x$ catalyst. The percentage by mass for each component is shown in Table 1. In each case, aluminum (Example 1 to Example 3) or an aluminum alloy including aluminum and manganese, customarily designated as $AlMg_3$ (Example 4), is sprayed in parallel with a mixture of the other components. The thermal activation of the reactive precursors (in this case: boehmite, gibbsite, vanadium oxalate, tungsten oxalate, metatitanic acid and the coprecipitate including a mixture of tungstic acid and metatitanic acid) occurs during thermal spraying. The composition which is applied is subjected to a calcination process to achieve final dewatering and the catalytically active oxidic structure of the composition that is applied. All of the catalytically active compositions produced according to Examples 1 to 4 have a BET surface area of from 60 to 70 $m^2$/g.

An X-ray structure analysis demonstrates the advantage of the process of the invention. If a reactive precursor in the form of metatitanic acid or the coprecipitate containing metatitanic acid is used for the catalytically active component titanium dioxide, the titanium dioxide present in the catalytically active composition is predominantly in the anatase modification. The thermal inactivation of the anatase modification by conversion into the rutile modification can be effectively avoided, since the reactive precursor is converted primarily into titanium dioxide in the anatase modification.

Phase transformation into the rutile modification does not take place. The situation is different if a titanium dioxide containing tungsten incorporated in interstitial lattice sites is used for the spraying material. Such a coprecipitate is not a reactive precursor for the purposes of the invention. No conversion takes place.

Referring now in detail to the single FIGURE of the drawing, there is seen a cross-section through a catalyst produced according to Example 1, for the degradation of nitrogen oxides by the $DeNO_x$ process. A support body 1 is a chromium-aluminum steel in the form of a plate having a thickness of 40 μm. A catalytically active composition 10 is applied on both sides by thermal spraying. The surface of the support body 1 in FIG. 1 has not been given any particular configuration, but it can, for example, be roughened by mechanical or chemical treatment. As a result of deformation on impact, aluminum oxide 2 adheres to the support body 1 due to adhesion forces. Aluminum 3 which is sprayed in parallel acts as a composite material, it links the individual catalytically active components both to one another and it also links the catalytically active composition 10 to the support body 1. The catalytically active components titanium dioxide ($TiO_2$) 4, vanadium pentoxide ($V_2O_5$) 5 and tungsten trioxide ($WO_3$) 6 are disposed around each microcrystallite of the aluminum oxide 2. In addition to the adhesion forces, the respective catalytically active components 4, 5, 6 and the aluminum oxide 2 are held together by chemical bonds due to the formation of ternary oxides. Such mixed oxides lead to a high abrasion resistance of the catalytically active composition 10. A long operating life of such a catalyst is associated therewith.

We claim:

1. In a process for producing a catalyst with a catalytically active composition on a support body by thermal spraying, the improvement which comprises:

thermally spraying a spraying material including a titanium hydroxide reactive precursor of at least one component of the catalytically active composition onto the support body, converting the titanium hydroxide reactive precursor to form the component, and carrying out the thermal spraying step with a spraying material including a coprecipitate.

2. The process according to claim 1, which comprises carrying out the thermal spraying step with a titanium metahydroxide as the titanium hydroxide.

3. The process according to claim 1, which comprises carrying out the step of conversion of the reactive precursor by thermal activation no earlier than during spraying.

4. The process according to claim 1, which comprises carrying out the thermal spraying step with a spraying material including further reactive precursors.

5. The process according to claim 4, which comprises selecting a substance from the group consisting of a metal salt and a hydroxy compound of a metal as a further reactive precursor.

6. The process according to claim 4, which comprises selecting a substance from the group consisting of an oxalate, a nitrate and a carbonate as a further reactive precursor.

7. The process according to claim 4, which comprises selecting a substance from the group consisting of an aluminum hydroxide, a gibbsite and a boehmite as a further reactive precursor.

8. The process according to claim 1, which comprises including tungsten and titanium in the coprecipitate.

9. The process according to claim 1, which comprises carrying out the step of converting the reactive precursor in an oxygen-containing atmosphere.

10. The process according to claim 1, which comprises carrying out the thermal spraying step with a powder mixture spraying material including separate powders each having a mean particle size of less than 50 μm.

11. The process according to claim 1, which comprises carrying out the thermal spraying step with a powder mixture spraying material including separate powders each having a mean particle size of less than 10 μm.

12. In a process for producing a catalyst with a catalytically active composition on a support body by thermal spraying, the improvement which comprises:

thermally spraying a spraying material including a titanium hydroxide reactive precursor of at least one component of the catalytically active composition onto the support body, thermally spraying a substance selected from the group consisting of a metal and a metal alloy in parallel with the spraying material, and intimately mixing the substance and the spraying material during spraying before they impinge on the support body, and converting the titanium hydroxide reactive precursor to form the component.

13. The process according to claim 12, which comprises selecting the metal sprayed in parallel from the group consisting of aluminum and an aluminum alloy.

* * * * *